US012711055B2

(12) United States Patent
Xu et al.

(10) Patent No.: US 12,711,055 B2
(45) Date of Patent: Aug. 18, 2026

(54) WORDLINE GROUP-BASED IDENTIFICATION OF GOOD MEMORY BLOCKS DURING A PROGRAMMING OPERATION

(71) Applicant: Micron Technology, Inc., Boise, ID (US)

(72) Inventors: Zhongguang Xu, San Jose, CA (US); Yang Liu, San Jose, CA (US); Lei Zhang, Singapore (SG); Hanping Chen, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/982,336

(22) Filed: Dec. 16, 2024

(65) Prior Publication Data

US 2025/0208992 A1 Jun. 26, 2025

Related U.S. Application Data

(60) Provisional application No. 63/612,720, filed on Dec. 20, 2023.

(51) Int. Cl.
*G06F 12/02* (2006.01)

(52) U.S. Cl.
CPC .................................. *G06F 12/023* (2013.01)

(58) Field of Classification Search
CPC ............... G06F 12/023; G06F 12/0215; G06F 12/0284; G11C 2029/1202; G11C 16/10; G11C 29/4401; G11C 29/78; G11C 29/883; G11C 16/08; G11C 16/0483
See application file for complete search history.

(56) References Cited

U.S. PATENT DOCUMENTS

2009/0282301 A1* 11/2009 Flynn .................. G06F 12/0246 714/763
2020/0050368 A1* 2/2020 Lee ....................... G06F 3/0652
2021/0191850 A1* 6/2021 Subbarao ................ G06F 3/064
2022/0122653 A1* 4/2022 Mayer ............... G11C 11/40626
2022/0199141 A1* 6/2022 Arai ..................... G11C 29/783
(Continued)

FOREIGN PATENT DOCUMENTS

KR 20160032910 A 3/2016
KR 20210121456 A 10/2021

OTHER PUBLICATIONS

International Search Report and Written Opinion for International Application No. PCT/US2024/060841, mailed Apr. 8, 2025, 09 Pages.

*Primary Examiner* — Sean D Rossiter
(74) *Attorney, Agent, or Firm* — Lowenstein Sandler LLP

(57) ABSTRACT

A processing device in a memory sub-system receives a request to execute a programming operation to program a target portion of a memory array of a memory device. In response to the request, a target wordline group associated with the target portion of the memory array is identified. Information associated with the target wordline group is identified, where the information identifies a first good portion of the target wordline group and a second bad portion of the target wordline group. The programming operation is caused to be executed to program the first good portion of the target wordline group and skip programming of the second bad portion of the target wordline group.

20 Claims, 6 Drawing Sheets

(56) References Cited

U.S. PATENT DOCUMENTS

| | | | | |
|---|---|---|---|---|
| 2023/0197186 | A1* | 6/2023 | Shetty | G11C 16/08<br>365/185.09 |
| 2025/0342284 | A1* | 11/2025 | Spica | G06F 21/73 |

* cited by examiner

Figure 2:
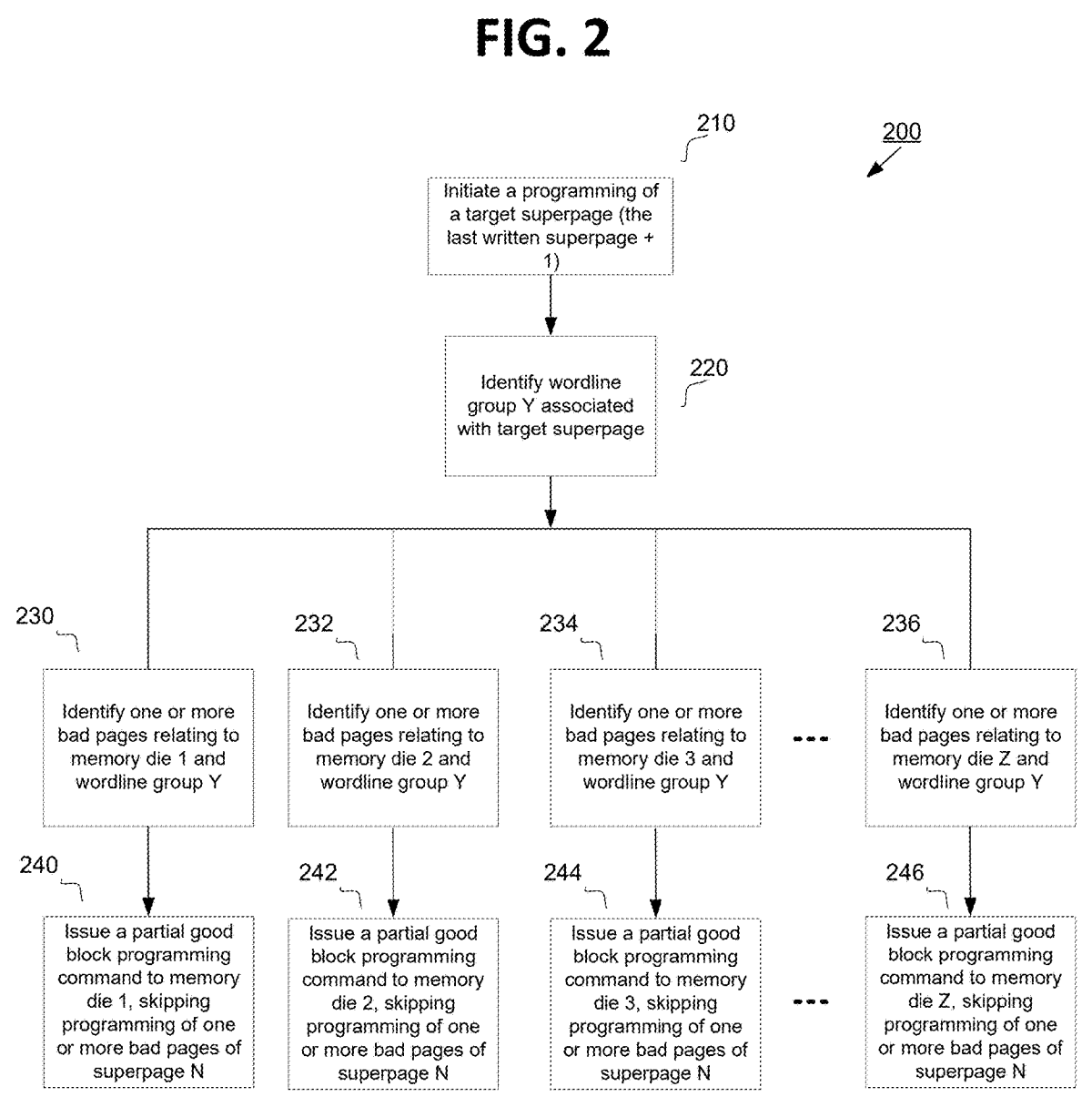

210 Initiate a programming of a target superpage (the last written superpage + 1)

220 Identify wordline group Y associated with target superpage

230 Identify one or more bad pages relating to memory die 1 and wordline group Y 232 Identify one or more bad pages relating to memory die 2 and wordline group Y 234 Identify one or more bad pages relating to memory die 3 and wordline group Y

...

236 Identify one or more bad pages relating to memory die Z and wordline group Y 240 Issue a partial good block programming command to memory die 1, skipping programming of one or more bad pages of superpage N 242 Issue a partial good block programming command to memory die 2, skipping programming of one or more bad pages of superpage N 244 Issue a partial good block programming command to memory die 3, skipping programming of one or more bad pages of superpage N

...

246 Issue a partial good block programming command to memory die Z, skipping programming of one or more bad pages of superpage N

FIG. 3

Superblock 300

| Wordline Group | Superpage | Memory die 1 Plane 1 | Memory die 1 Plane 2 | Memory die 1 Plane 3 | Memory die 1 Plane 4 | Memory die 1 Plane P | Memory die 2 Plane 1 | Memory die 2 Plane 2 | Memory die 2 Plane 3 | Memory die 2 Plane 4 | Memory die 2 Plane P |
|---|---|---|---|---|---|---|---|---|---|---|---|
| Wordline Group 1 (WGr 1) | Superpage 1 | X | Programmed | Programmed | Programmed | Programmed | Programmed | Programmed | X | Programmed | Programmed |
| | Superpage 2 | X | Programmed | Programmed | Programmed | Programmed | Programmed | Programmed | X | Programmed | Programmed |
| | Superpage 3 | X | Programmed | Programmed | Programmed | Programmed | Programmed | Programmed | X | Programmed | Programmed |
| Wordline Group 2 (WGr 2) | Superpage 4 | Programmed | Programmed | X | Programmed | X | Programmed | Programmed | Programmed | Programmed | X |
| | **Superpage 5** | *Programming* | *Programming* | **Skip** | *Programming* | **Skip** | *Programming* | *Programming* | *Programming* | *Programming* | **Skip** |
| | Superpage 6 | | 310 | X | 312 | X | | | | 314 | X |
| Wordline Group 3 (WGr 3) | Superpage 7 | | | X | | | | X | | | X |
| | Superpage 8 | | | X | | | | X | | | X |
| | Superpage 9 | | | X | | | | X | | | X |
| Wordline Group 4 (WGr 4) | Superpage 10 | | | | | | | X | | | |
| | Superpage 11 | | | | | | | X | | | |
| | Superpage 12 | | | | | | | X | | | |

WORDLINE GROUP-BASED IDENTIFICATION OF GOOD MEMORY BLOCKS DURING A PROGRAMMING OPERATION

CROSS-REFERENCE TO RELATED APPLICATION

This application claims the benefit of U.S. Provisional Application No. 63/612,720, titled "Wordline Group-based Identification of Good Memory Blocks During a Programming Operation," filed Dec. 20, 2023, which is hereby incorporated herein by reference in its entirety.

TECHNICAL FIELD

Embodiments of the disclosure relate generally to memory sub-systems, and more specifically, relate to a wordline group-based identification of good memory blocks during execution of a programming operation in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIG. 2 is an example process flow relating to a multi-plane partial good block programming operation executed using wordline group-based identification of partial good blocks to enable the use of the good block portion during the programming, while skipping the bad block portion of the memory block, in accordance with one or more embodiments of the present disclosure.

FIG. 3 illustrates an example of executing a partial good block programming operation associated with a memory sub-system include two memory dies, in accordance with one or more embodiments of the present disclosure.

DETAILED DESCRIPTION

Figure 1A:
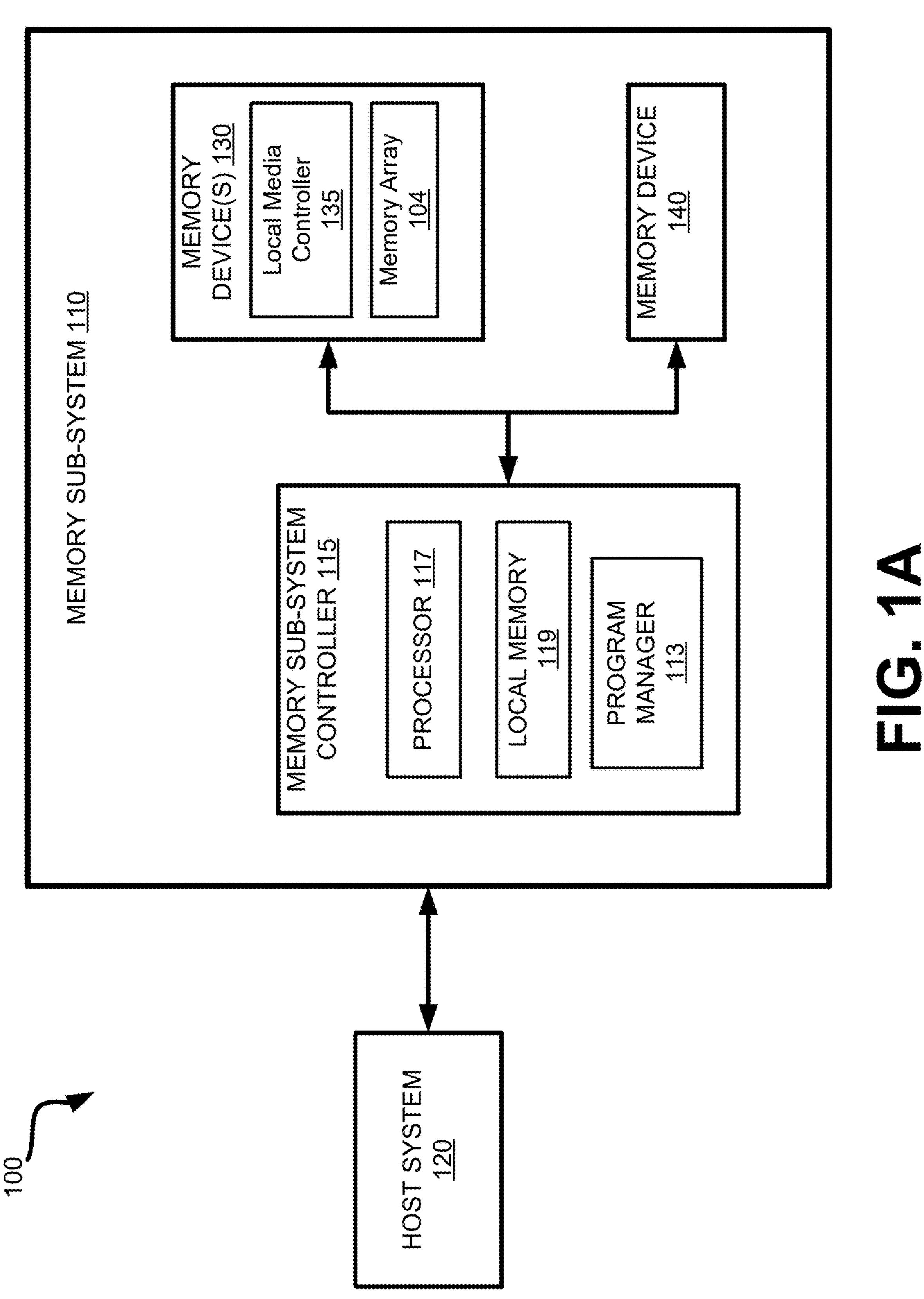
FIG. 1A illustrates an example computing system that includes a memory sub-system in accordance with one or more embodiments of the present disclosure.

Aspects of the present disclosure are directed to a wordline group-based identification of good memory blocks during execution of a programming operation in a memory sub-system. A memory sub-system can be a storage device, a memory module, or a hybrid of a storage device and memory module. Examples of storage devices and memory modules are described below in conjunction with FIG. 1A. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. For example, NAND memory, such as 3D flash NAND memory, offers storage in the form of compact, high density configurations. A non-volatile memory device is a package of one or more memory dies, each including one or more planes. For some types of non-volatile memory devices (e.g., NAND memory), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or a three-dimensional grid. Memory cells are formed onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane.

A memory die is also referred to as a logical unit (LUN). A LUN can contain one or more planes. A memory sub-system can use a striping scheme to treat various sets of data as units when performing data operations (e.g., write, read, erase). A LUN stripe is a collection of planes that are treated as one unit when writing, reading, or erasing data. Each plane in a LUN stripe can carry out the same operation, in parallel, on all the other planes in the LUN stripe. A block stripe is a collection of blocks that are treated as a unit. A block stripe can be a physical block stripe associated with a plane of a LUN or a logical block stripe including blocks that are mapped to the logical block stripe by processing logic. The blocks in a block stripe have the same identifier(s) that associates the blocks to the block stripe (e.g., block number, block stripe index, etc.).

Some memory devices, such as three-dimensional (3D) cross-point devices, can include multiple decks represented by respective two-dimensional (2D) arrays of memory cells electronically addressable by a vertical access line(s) (e.g., wordline(s)). Multiple decks can be stacked within a memory device (e.g., stacked vertically). Certain memory devices are divided into multiple decks to mitigate the performance and reliability penalties. For example, as a desire for increased storage capacity in memory devices drives an expansion of block sizes, including an increase of the number of wordlines in each block, the presence of such additional wordlines, however, presents certain challenges including, for example, performance and reliability penalties attributable to various inefficiencies (e.g., associated with garbage collection or other media management operations for the increased block size). As such, a memory device could include a top (or "upper") deck and a bottom (or "lower") deck, each including a respective set of wordlines from the memory device. The separate decks are individually accessible, such that a memory access operation (i.e., a program, read, or erase operation) could be performed on one deck without impacting memory cells of the other deck.

In some implementations, a controller of a memory sub-system utilizes a data striping scheme, according to which each data payload (e.g., user data) utilizes multiple dies of a memory device (e.g., NAND type flash memory devices). One example of a memory sub-system is a solid-state drive (SSD). Each payload can be distributed through a subset of memory dies, while the remaining one or more memory dies are used to store error correction information (e.g., parity bits). A set of blocks distributed across a set of memory dies of a memory device using a data striping scheme is referred to herein as a "superblock." In some cases, a superblock spans all (or at least a subset of) the memory dies within a memory device. A superblock can contain multiple blocks from a single memory die, such as one block per plane. The programming and erasing of data of a superblock can be managed on a superblock basis or other granularity of "superpages", which represents a page programmed to multiple memory dies as a lowest addressable unit of memory. The superpage can include a set of pages of multiple different planes (e.g., Plane 1 to Plane N) of multiple different memory dies (e.g., Memory Die 1 to Memory Die M).

To write host data to pages of a superpage, a controller can identify a superpage including a set of pages available for programming, and initiate a programming operation to write the host data to a set of pages of the superpage. More specifically, the programming operation can write host data to an open block of the set of blocks. An open block refers to a block that is open for programming. An open block can be an empty block or a partially filled block. An open page refers to an empty page of a block that can be programmed with host data (e.g., a programmable page). A programmed page refers to a page of a block that is programmed with host data.

A memory sub-system includes memory devices having bad blocks. A "bad block" herein refers to a block that is no longer reliable for storing or retrieving data, for example, due to a defect (e.g., manufacturing defect) or due to wear. A manufactured bad block (MBB) is unreliable due to such a defect and may already be listed in a bad block list (or look up table). During manufacturing, a bad block can be categorized into two main types: recoverable and unrecoverable. For example, a recoverable bad block may be due to a wordline-to-wordline short, an open wordline, a wordline that is slow to program, or a wordline that fails an error level requirement (e.g., a raw bit error rate (RBER) requirement). Examples of unrecoverable bad blocks include blocks that are defective due to wordline-to-pillar shorts, select gate shorts, or dummy wordline shorts.

As the size of memory devices increases, the size of memory blocks grows larger and larger. As a result, a single defect in a memory block causes a loss of a larger portion of memory space. This leads to a higher yield cost which limits over-provision configurations and performance of the memory device. For a recoverable bad block, the memory block can still be used in a memory access operation (e.g., a programming operation) if the one or more defective wordlines are skipped during execution of a memory access operation.

In some implementations, if a part or portion of block has a defect, the entire block is marked as "bad". To try and remedy the loss of an entire block due to a partially defective portion, some implementations employ a "half good block" approach. The half good block approach requires identifying a memory block having an entire deck (e.g., the entire top deck or the entire bottom deck) that is good in order to identify the block as useable. If the half deck is identified as good, the entire good portion of the block may be used in a programming operation, while the remaining bad portion of the block is not used. This approach, however, is inefficient since it enables the use of only certain types of recoverable bad blocks which include an entire half deck that is good. In this regard, either the entire upper deck or the entire lower deck must be good for the good portion of the block to be recoverable, otherwise the entire block is identified as a non-recoverable bad block. Accordingly, the half good block approach fails to optimize recovery of partial bad blocks, thus leading to a lower number of valid blocks (NVB) yield.

Aspects of the present disclosure address the above and other deficiencies by implementing a wordline group-based identification of a good and useable portion of a partially good block of a memory device for use in execution of a programming operation in a memory sub-system. In an embodiment, a wordline group includes a group or set of multiple wordlines of the memory device. In an embodiment, each wordline group of the set of wordline groups can include a predetermined number (K) of adjacent wordlines. For example, a first wordline group can include wordlines 1 through K (where K=32), a second wordline group can include wordlines 33 to 64, a third wordline group can include wordlines 65 to 86, and so on.

In an embodiment, during an initial stage (e.g., during memory device manufacturing), defective blocks are identified and marked as either recoverable bad blocks or unrecoverable bad blocks. For the identified recoverable bad blocks, a set of information relating to the partially good blocks (herein the "partial good block (PGB) information") is recorded and stored in a portion of the memory device (e.g., a one-time program area of the memory device).

According to embodiments, the partial good block information includes a block address associated with the block (e.g., partially good block number 100) and information identifying one or more wordline groups (WGR) numbers and plane number (e.g., Plane 1, Plane 2 . . . Plane P) associated with a bad portion of the partially good block (e.g., bad WGr/plane: WGr 0, plane 2; WGr 1, plane 5). According to embodiments, the partial good block information includes a wordline group-based identification of a bad portion of a block that is not to be used (i.e., skipped) during execution of a subsequent programming operation. In an embodiment, a block can be identified as a partial good block if a condition is satisfied. In an embodiment, the condition is satisfied if a percentage of the good (i.e., useable) portion of the block (i.e., a percentage of the wordline groups of the block) is greater than or equal to a threshold level. For example, a first block can be identified as a partial good block if the percentage of good wordline groups associated with the block is greater than 30% (i.e., the threshold level). In this example, a block qualifies as a partial good block if greater than 30% of the wordline groups of that block are identified as good wordline groups.

According to embodiments, a multi-plane partial good block (PGB) programming operation may be executed using the wordline group-based identification of partial good blocks to enable the use of the good block portion during the programming, while skipping the bad block portion of the memory block (i.e., the WGR portion associated with the bad portion of the partially good block). In an embodiment, the stored partially good block (PGB) information is read out from the memory device and stored in a data structure for use during execution of the multi-plane PGB programming operation.

In response to a request for the execution of a programming operation associated with a target superpage, a corresponding target wordline group (e.g., identified by a wordline group number) to which the target superpage belongs is identified. Upon identification of the target wordline group, a look-up operation using the data structure is performed to determine the partial good block information associated with the target memory die and the target wordline group. Using the partial good block information, the multi-plane partial good block (PGB) programming operation is executed to program a first portion of the target memory die corresponding to the good portion of the memory die, while skipping programming of the identified bad portion of the superpage corresponding to the identified wordline group and one or more planes with the identified bad block status.

Advantageously, the bad or missing portion of the superpage is identified, using the wordline group-based partial good block (PGB) information and skipped during the multi-plane PGB programming operation of the present disclosure. Furthermore, the good portion of the superpage (i.e., the portion that is not part of the identified bad wordline groups and one or more planes) is used during the programming operation. This results in an increase in the number of valid blocks yield of the memory sub-system and improved system performance.

FIG. 1A illustrates an example computing system 100 that includes a memory sub-system 110 in accordance with some embodiments of the present disclosure. The memory sub-system 110 can include media, such as one or more ultra-high endurance storage class memory devices (e.g., memory device 140), one or more non-volatile memory devices (e.g., one or more memory device(s) 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., the one or more memory device(s) 130) when the memory sub-system 110 is coupled with the host system 120 by the PCIe interface. The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. For example, the ultra-high endurance storage class memory device 140 can include any of a number of different types of memory media or "cells" that are non-volatile and offer lower program/read latency than 3D NAND type flash memory, including both SLC memory and QLC memory. In addition, the ultra-high endurance storage class memory device 140 can have higher endurance (i.e., can tolerate a greater number of program/erase cycles) than memory device 130. Some examples of ultra-high endurance storage class memory include hybrid random access memory (HRAM), three-dimensional cross-point ("3D cross-point") memory, or others.

Some examples of non-volatile memory devices (e.g., memory device(s) 130) include not-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory device(s) 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), or penta-level cells (PLCs) can store multiple bits per cell. In some embodiments, each of the memory devices 130 can include one or more arrays of memory cells such as SLCs, MLCs, TLCs, QLCs, PLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, electrically erasable programmable read-only memory (EEPROM).

A memory sub-system controller 115 (or controller 115 for simplicity) can communicate with the memory device(s) 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device(s) 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory device(s) 130. The memory sub-system controller 115 can further include host interface circuitry to communicate with the host system 120 via the physical host interface. The host interface circuitry can convert the commands received from the host system into command instructions to access the memory device(s) 130 as well as convert responses associated with the memory device(s) 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device(s) 130.

In some embodiments, the memory device(s) 130 include local media controllers 135 that operate in conjunction with memory sub-system controller 115 to execute operations on one or more memory cells of the memory device(s) 130. An external controller (e.g., memory sub-system controller 115) can externally manage the memory device 130 (e.g., perform media management operations on the memory device(s) 130). In some embodiments, a memory device 130 is a managed memory device, which is a raw memory device (e.g., memory array 104) having control or processing logic (e.g., local controller 135) for media management within the same memory device package. An example of a managed memory device is a managed NAND (MNAND) device. Memory device(s) 130, for example, can each represent a single die having some control logic (e.g., local media controller 135) embodied thereon. In some embodiments, one or more components of memory sub-system 110 can be omitted.

In one embodiment, the memory sub-system controller 115 includes a program manager 113 that can implement a wordline group-based identification of a good and useable portion of a partial good block of a memory device for use in execution of a programming operation in a memory sub-system. In an embodiment, during an initial stage (e.g., during manufacturing), information identifying bad or missing wordline groups (also referred to as "wordline group-based partial good block (PGB) information" or "PGB information") is stored in a data structure of the memory sub-system 110.

In an embodiment, the program manager 113 reviews the information stored in the data structure to identify one or more wordline groups associated with a target block that are labeled or denoted as bad or missing. Using the wordline group-based partial good block (PGB) information, the program manager 113 causes the execution of the programming operation to program a first portion of the target block (i.e., the good portion), while skipping the programming of a second portion of the target block (i.e., the portion associated with the identified bad wordline groups).

Advantageously, identifying the good wordline group portion and a bad wordline group portion of the target memory block enables the improvement of the number of valid block yield, as compared to a typical half good block approach, since a larger portion of the target block can be identified and used during a programming operation. Further details with regards to the operations of program manager 113 are described below.

Figure 1B:
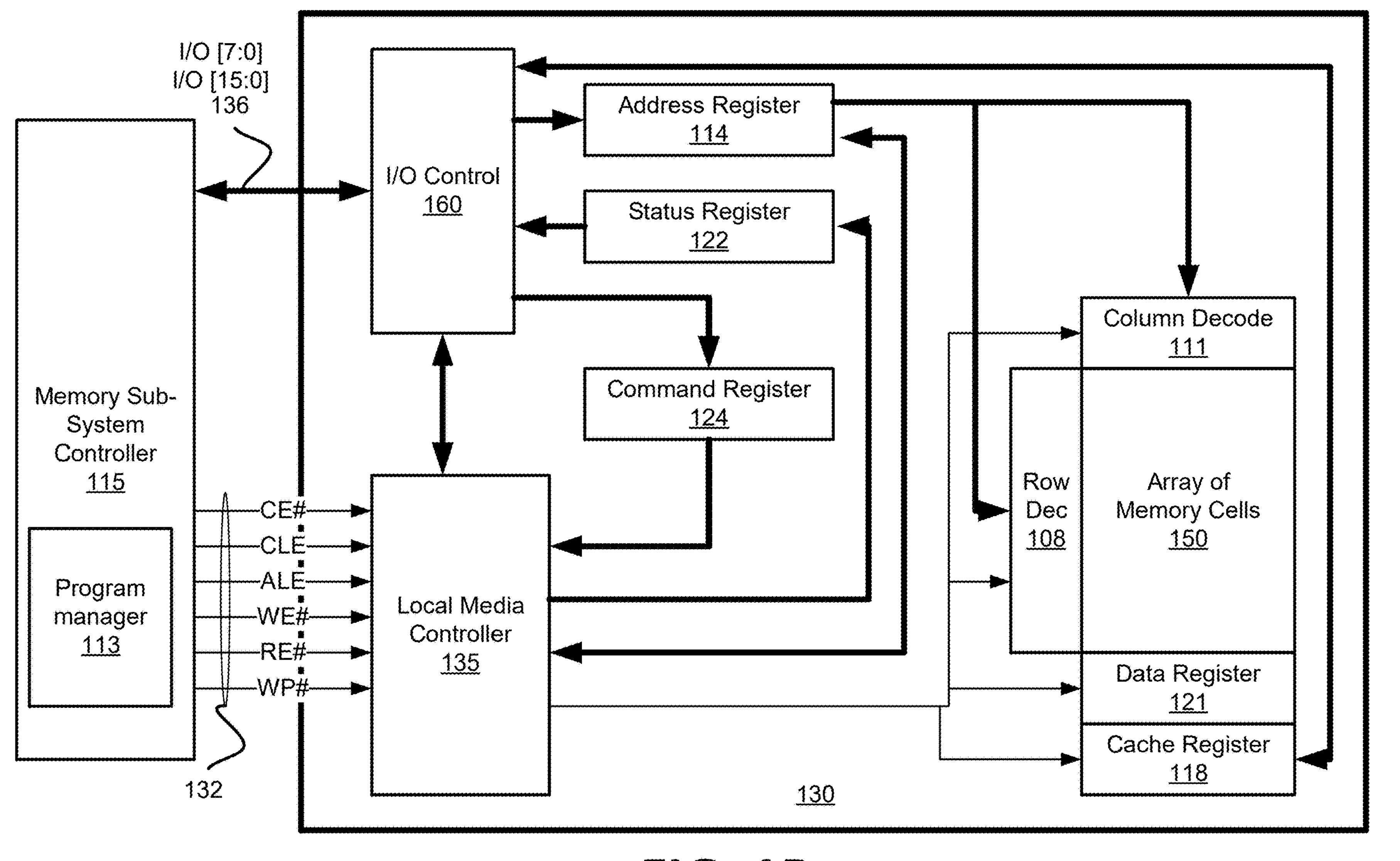
FIG. 1B is a block diagram of a memory device in communication with a memory sub-system controller of a memory sub-system, in accordance with one or more embodiments of the present disclosure.

FIG. 1B is a simplified block diagram of a first apparatus, in the form of a memory device 130, in communication with a second apparatus, in the form of a memory sub-system controller 115 of a memory sub-system (e.g., memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device. In one embodiment, the memory sub-system controller 115 includes program manager 113, which can implement the wordline group-based identification of a first portion (i.e., a good portion) of a block during a programming operation, while skipping the programming of a second portion (i.e., a bad portion) of the block, as described herein.

Memory device 130 includes an array of memory cells 150 logically arranged in rows and columns. Memory cells of a logical row are typically connected to the same access line (e.g., a wordline) while memory cells of a logical column are typically selectively connected to the same data line (e.g., a bitline). A single access line may be associated with more than one logical row of memory cells and a single data line may be associated with more than one logical column. Memory cells (not shown in FIG. 1B) of at least a portion of array of memory cells 250 are capable of being programmed to one of at least two target data states.

Row decode circuitry 108 and column decode circuitry 111 are provided to decode address signals. Address signals are received and decoded to access the array of memory cells 150. Memory device 130 also includes input/output (I/O) control circuitry 112 to manage input of commands, addresses and data to the memory device 130 as well as output of data and status information from the memory device 130. An address register 114 is in communication with I/O control circuitry 212 and row decode circuitry 108 and column decode circuitry 111 to latch the address signals prior to decoding. A command register 124 is in communication with I/O control circuitry 112 and local media controller 135 to latch incoming commands.

A controller (e.g., the local media controller 135 internal to the memory device 130) controls access to the array of memory cells 150 in response to the commands and generates status information for the external memory sub-system controller 115, i.e., the local media controller 135 is configured to perform access operations (e.g., read operations, programming operations and/or erase operations) on the array of memory cells 150. The local media controller 135 is in communication with row decode circuitry 108 and column decode circuitry 111 to control the row decode circuitry 108 and column decode circuitry 111 in response to the addresses. In one embodiment, local media controller 135 includes program manager 134, which can implement the wordline group-based identification of a first portion (i.e., a good portion) of a block during a programming operation, while skipping the programming of a second portion (i.e., a bad portion) of the block, as described herein.

The local media controller 135 is also in communication with a cache register 118. Cache register 118 latches data, either incoming or outgoing, as directed by the local media controller 135 to temporarily store data while the array of memory cells 150 is busy writing or reading, respectively, other data. During a program operation (e.g., write operation), data may be passed from the cache register 118 to the data register 121 for transfer to the array of memory cells 150; then new data may be latched in the cache register 118 from the I/O control circuitry 212. During a read operation, data may be passed from the cache register 118 to the I/O control circuitry 112 for output to the memory sub-system controller 115; then new data may be passed from the data register 121 to the cache register 118. The cache register 118 and/or the data register 121 may form (e.g., may form a portion of) a page buffer of the memory device 130. A page buffer may further include sensing devices (not shown in FIG. 1B) to sense a data state of a memory cell of the array of memory cells 150, e.g., by sensing a state of a data line connected to that memory cell. A status register 122 may be in communication with I/O control circuitry 112 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) may be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 133 and outputs data to the memory sub-system controller 115 over I/O bus 133.

For example, the commands may be received over input/output (I/O) pins [7:0] of I/O bus 133 at I/O control circuitry 112 and may then be written into command register 124. The addresses may be received over input/output (I/O) pins [7:0] of I/O bus 234 at I/O control circuitry 112 and may then be written into address register 114. The data may be received over input/output (I/O) pins [7:0] for an 8-bit device or input/output (I/O) pins [15:0] for a 16-bit device at I/O control circuitry 112 and then may be written into cache register 118. The data may be subsequently written into data register 121 for programming the array of memory cells 150.

In an embodiment, cache register 118 may be omitted, and the data may be written directly into data register 121. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIG. 1B has been simplified. It should be recognized that the functionality of the various block components described with reference to FIG. 1B may not necessarily be segregated to distinct components or component portions of an integrated circuit device. For example, a single component or component portion of an integrated circuit device could be adapted to perform the functionality of more than one block component of FIG. 1B. Alternatively, one or more components or component portions of an integrated circuit device could be combined to perform the functionality of a single block component of FIG. 1B. Additionally, while specific I/O pins are described in accordance with popular conventions for receipt and output of the various signals, it is noted that other combinations or numbers of I/O pins (or other I/O node structures) may be used in the various embodiments.

FIG. 2 is an example process flow 200 relating to a multi-plane partial good block (PGB) programming operation executed using wordline group-based identification of partial good blocks to enable the use of the good block portion during the programming, while skipping the bad block portion of the memory block (i.e., the WGR portion associated with the bad portion of the partially good block), according to embodiments of the present disclosure. As shown in FIG. 2, at block 210, control logic (e.g., program manager 113 of FIG. 1A and FIG. 1B) can cause initiation of an operation to program a superpage of a superblock of a multi-die memory sub-system. In this example, the superblock includes multiple memory dies (e.g., memory die 1, memory die 2 . . . memory die Z), where each memory die includes multiple planes (e.g., plane 1 to plane P). In an embodiment, each superblock of the memory sub-system can include multiple wordline groups (e.g., wordline group 1 to wordline group N), where each wordline group includes a set of multiple wordlines. In an embodiment, each wordline group of the set of wordline groups can include a predetermined number (K) of adjacent wordlines. For example, a first wordline group can include wordlines 1 through K (where K=32), a second wordline group can include wordlines 33 to 64, a third wordline group can include wordlines 65 to 86, and so on.

In block 220, a wordline group associated with the target superpage is identified. In the example shown, the target superpage is identified as belonging to wordline group Y. In block 230, the control logic performs a look-up operation using a data structure storing the partial good block information relating to the memory sub-system (e.g., the partial good block information previously stored during manufacturing). In block 230, the control logic determines the partial good block information for a first memory die of the memory sub-system (i.e., memory die 1) to determine the status associated with wordline group Y. In an embodiment, the partial good block information includes stored information which identifies a superblock address and one or more bad wordline groups corresponding to the superblock. For example, in block 230, control logic can determine the partial good block information for memory die 1 identifies wordline group 1/plane 4 and wordline group 2/plane 2 as being bad (e.g., the partial good block information=(memory die 1, superblock address, bad WGr 1/plane 4; bad WGr 2/plane 2)). In this example, the control logic determines that the remaining wordline groups are good wordline groups and marked for use during the programming operation. Accordingly, using the partial good block information associated with the first memory die, the control logic can determine if a status associated with wordline group Y (i.e., determine that wordline group Y is a good wordline group or a bad wordline group).

In block 232, the control logic determines the partial good block information or status associated for a second memory die of the memory sub-system (i.e., memory die 2). In an embodiment, the partial good block information includes stored information which identifies a superblock address and one or more bad wordline groups and one or more planes corresponding to the superblock for memory die 2. For example, in block 232, the control logic can determine the partial good block information for memory die 2 identifies WGr 7/plane 2 and WGr 15/plane 6 as being bad (e.g., the partial good block information=(memory die 2, superblock address, bad WGr 7/plane 2 and bad WGr 15/plane 6)). In this example, the control logic determines that the remaining wordline groups are good wordline groups and marked for use during the programming operation. Accordingly, using the partial good block information associated with the second memory die, the control logic can determine if a status associated with wordline group Y (i.e., determine that wordline group Y is a good wordline group or a bad wordline group).

Like blocks 230 and 232, in blocks 234 and 236, the control logic determines the partial good block information associated with wordline group Y for a third memory die of the memory sub-system (i.e., memory die 3) and a last memory die of the memory sub-system (i.e., memory die Z), respectively. In an embodiment, in operations 230 to 236, the partial good block information is identified for wordline group Y for all of the memory dies of the memory sub-system.

In block 240, using the partial good block information identified in block 230, the control logic issues a partial good block programming command to memory die 1, where the command identifies one or more bad pages corresponding to the one or more identified bad wordline groups/plane(s) that are to be skipped during programming. For example, if wordline group Y is identified as a bad wordline group for memory die 1, the control logic causes the programming of the pages of corresponding one or more bad planes of the target superpage corresponding to wordline group Y of memory die 1 to be skipped. In another example, if wordline group Y is not identified as a bad wordline group for memory die 1, the control logic causes the programming of the pages of the target superpage corresponding to wordline Y.

In block 242, using the partial good block information identified in block 232, the control logic issues a partial good block programming command to memory die 2, where the command identifies one or more bad pages corresponding to the one or more identified bad wordline groups that are to be skipped during programming. For example, if wordline group Y is identified as a bad wordline group for memory die 2, the control logic causes the programming of the pages of corresponding one or more bad planes of the target superpage corresponding to wordline group Y of memory die 2 to be skipped. In another example, if wordline group Y is not identified as a bad wordline group for memory die 2, the control logic causes the programming of the pages of the target superpage corresponding to wordline Y.

In block 244, using the partial good block information identified in block 234, the control logic issues a partial good block programming command to memory die 3, where the command identifies one or more bad pages corresponding to the one or more identified bad wordline groups that are to be skipped during programming. For example, if wordline group Y is identified as a bad wordline group for memory die 3, the control logic causes the programming of the pages of corresponding one or more bad planes of the target superpage corresponding to wordline group Y of memory die 3 to be skipped. In another example, if wordline group Y is not identified as a bad wordline group for memory die 3, the control logic causes the programming of the pages of the target superpage corresponding to wordline Y.

In block 246, using the partial good block information identified in block 236, the control logic issues a partial good block programming command to memory die Z, where the command identifies one or more bad pages corresponding to the one or more identified bad wordline groups that are to be skipped during programming. For example, if wordline group Y is identified as a bad wordline group for memory die Z, the control logic causes the programming of the pages of corresponding one or more bad planes of the target superpage corresponding to wordline group Y of memory die Z to be skipped. In another example, if wordline group Y is not identified as a bad wordline group for memory die Z, the control logic causes the programming of the pages of the target superpage corresponding to wordline Y.

FIG. 3 illustrates an example of executing a partial good block programming operation associated with a memory sub-system include two memory dies (i.e., memory die 1 and memory die 2), according to embodiments of the present disclosure. As shown in the example of FIG. 3, the superblock 300 includes four wordline groups (WGr 1, WGr 2, WGr 3, and WGr 4) and each wordline group includes multiple superpages (e.g., WGr 1 includes superpage 1, superpage 2, and superpage 3). In the example shown in FIG. 3, memory die 1 and memory die 2 each include a set of multiples planes (e.g., plane 1 through plane P).

In the example shown in FIG. 3, upon completion of the programming of superpage 4, the control logic (e.g., program manager 113 of FIGS. 1A and 1B) initiates execution of a partial good block programming operation to program super page 5. According to embodiments, the control logic determines which wordline group/plane(s) are identified as bad wordline groups. In an embodiment, the control logic performs a look-up operation to identify the partial good block information associated with superblock 300. In the example shown in FIG. 3, the partial good block information associated with superblock 300 and memory die 1 identifies the following bad wordline groups: wordline group 2/plane 3; wordline group 2/plane P; and wordline group 3/plane 3. In the example shown in FIG. 3, the partial good block information associated with superblock 300 and memory die 2 identifies the following bad wordline groups: wordline group 3/plane 3; wordline group 4/plane 2; wordline group 2/plane P; and wordline group 3/plane P.

In an embodiment, using the partial good block information (i.e., the information stored in the memory sub-system at a time of manufacturing), the control logic programs a first portion of superpage 5, while skipping (310, 312, and 314 of FIG. 3) the bad or missing portions of superpage 5. In this example, based on the partial good block information, the control logic skips programming of the pages associated with memory die 1/WGr 2/plane 3; memory die 1/WGr2/plane P; and memory die 2/WGr2/plane P, while programming the remaining portion of superpage 5, as shown in FIG. 3.

Figure 4:
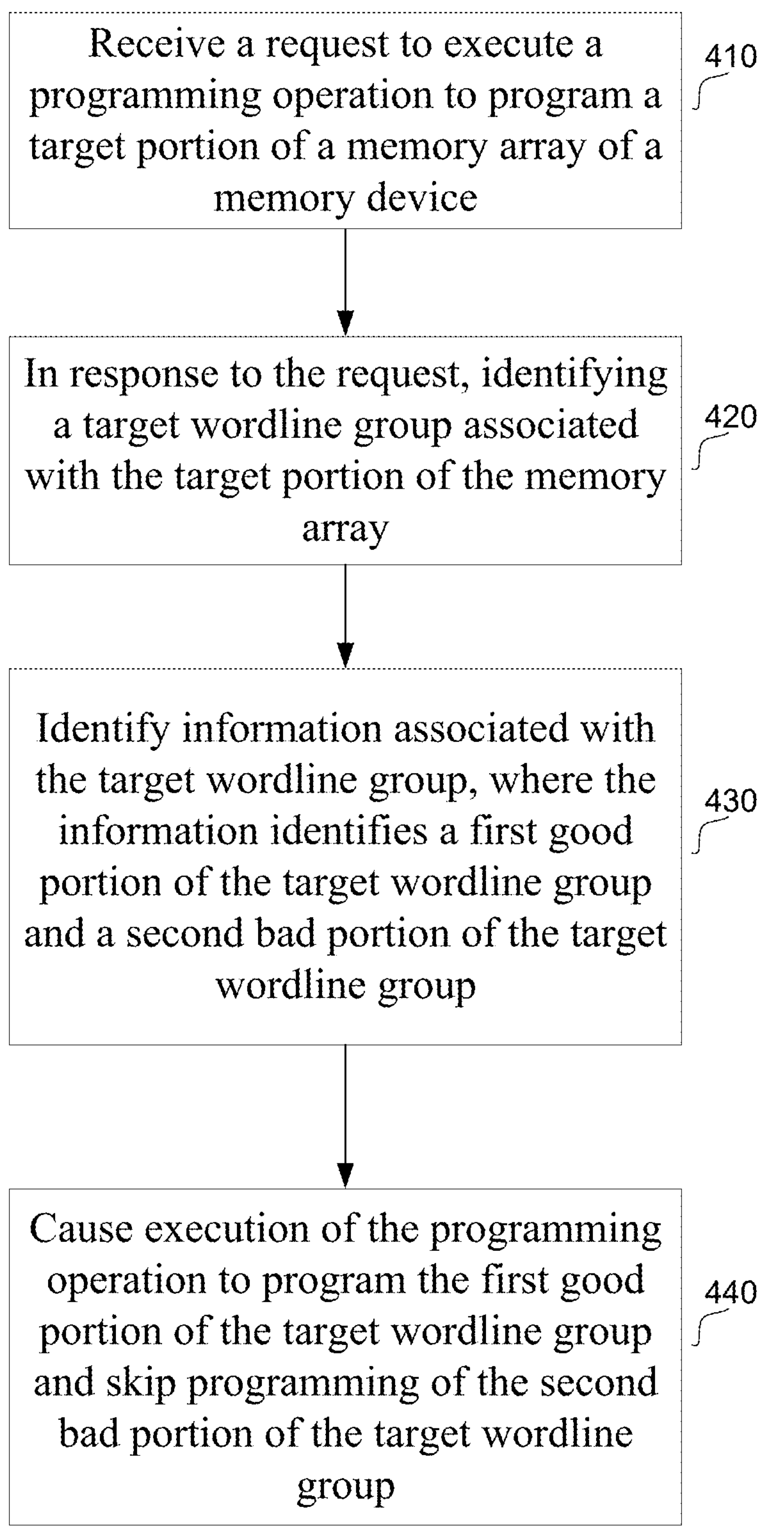
FIG. 4 is a flow diagram of an example of a multi-plane partial good block programming operation executed using wordline group-based identification of partial good blocks to enable the use of the good block portion during the programming, while skipping the bad block portion of the memory block, in accordance with one or more embodiments of the present disclosure.

FIG. 4 is a flow diagram of an example method of a multi-plane partial good block (PGB) programming operation executed using wordline group-based identification of partial good blocks to enable the use of the good block portion during the programming, while skipping the bad block portion of the memory block (i.e., the WGR portion associated with the bad portion of the partially good block), in accordance with one or more embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by program manager 113 of FIG. 1A and FIG. 1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic (e.g., program manager 113) receives a request to execute a programming operation to program a target portion of a memory array of a memory device. In an embodiment, the target portion of the memory array is a superpage including multiple pages corresponding to multiple planes (e.g., plane 1 to plane P) of a superblock including a set of multiple memory dies (e.g., memory die 1 to memory die Z).

At operation 420, in response to the request, the processing logic a target wordline group (e.g., wordline group Y of FIG. 2) associated with the target portion of the memory array. In an embodiment, each superblock of the memory sub-system can include multiple wordline groups (e.g., wordline group 1 to wordline group N), where each wordline group includes a set of multiple wordlines. In an embodiment, each wordline group of the set of wordline groups can include a predetermined number (K) of adjacent wordlines. For example, a first wordline group can include wordlines 1 through K (where K=32), a second wordline group can include wordlines 33 to 64, a third wordline group can include wordlines 65 to 86, and so on.

At operation 430, the processing logic identifies information associated with the target wordline group, where the information identifies a first good portion of the target wordline group and a second bad portion of the target wordline group. In an embodiment, the information associated with the target wordline group (i.e., the partial good block information) identifies the superblock address information, wordline group number, and plane information associated with a bad portion of the block. In an embodiment, during manufacturing, the partial good block information identifying the bad or missing portions of the wordline group is identified and stored in a portion of the memory device (e.g., a one-time program area of the NAND).

At operation 440, the processing logic causes execution of the programming operation to program the first good portion of the target wordline group and skip programming of the second bad portion of the target wordline group. Advantageously, the wordline group-based identification of bad portions of the memory device can be used during a programming operation to skip those portions and improve the number of valid block yield and performance of the memory device.

Figure 5:
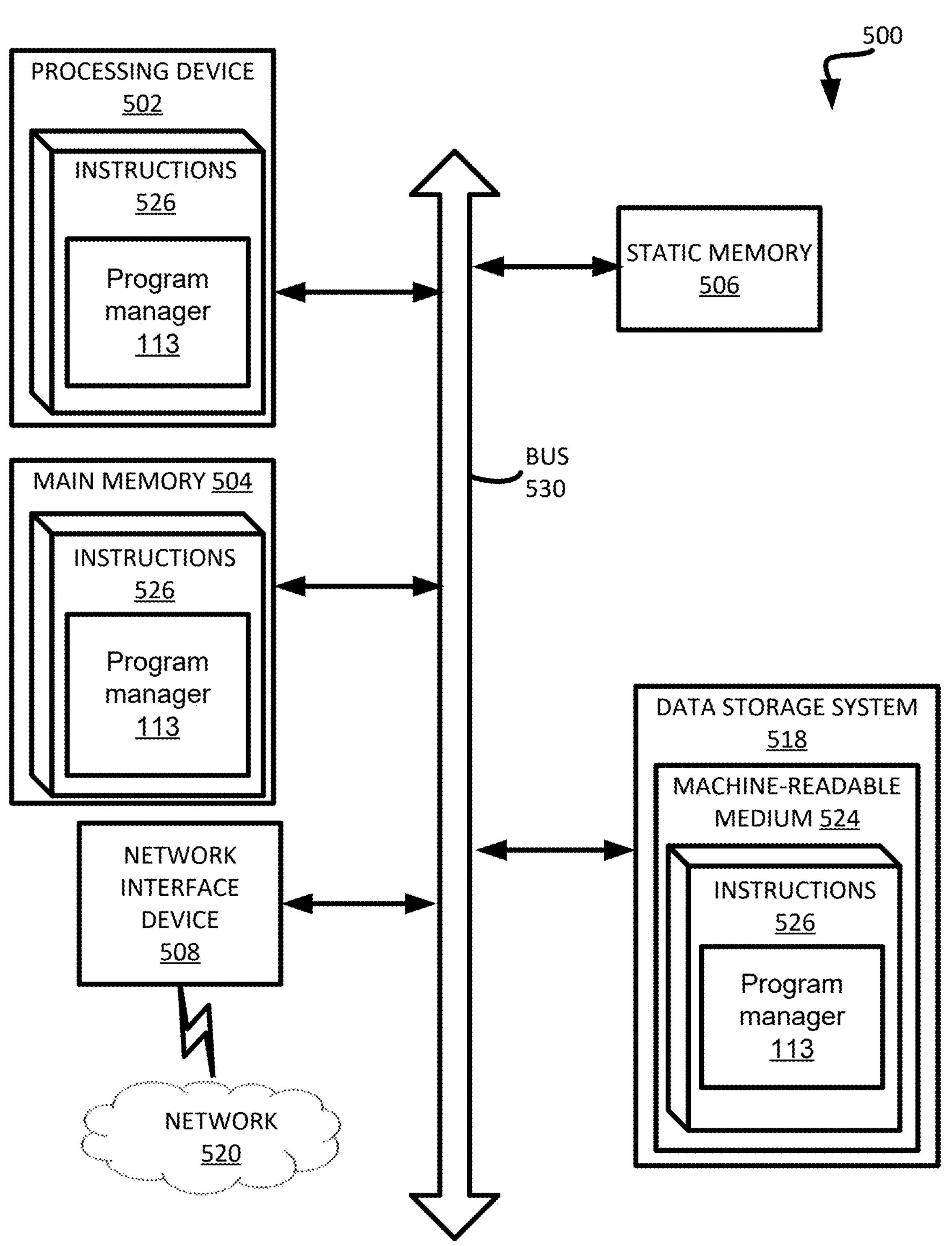
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the program manager 113 of FIG. 1A and FIG. 1B). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1A.

In one embodiment, the instructions 526 include instructions to implement functionality corresponding to the program manager 113 of FIG. 1A). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory device comprising:

a memory array; and control logic, operatively coupled with the memory array, to perform operations comprising:

receiving a request to execute a programming operation to program a target portion of the memory array;

in response to the request, identifying a target wordline group associated with the target portion of the memory array;

identifying information associated with the target wordline group, wherein the information identifies a first good portion of the target wordline group and address information associated with a second bad portion of the target wordline group; and causing execution of the programming operation to program the first good portion of the target wordline group and using the address information associated with the second bad portion to selectively skip programming of the second bad portion of the target wordline group during the programming operation.

2. The memory device of claim 1, wherein the control logic is to perform further operations comprising performing a look-up operation of a data structure storing the information associated with the target wordline group.

3. The memory device of claim 1, wherein the information associated with the target wordline group is identified during a power up operation associated with the memory device.

4. The memory device of claim 1, wherein the target portion of the memory array corresponds to a first memory die and a second memory die of the memory device.

5. The memory device of claim 4, wherein the first memory die comprises a first set of memory planes and the second memory die comprises a second set of memory planes.

6. The memory device of claim 5, wherein the information comprises a block address and a plane address of the target wordline group.

7. The memory device of claim 1, wherein the information identifying the second bad portion of the target wordline group is stored in a data structure of the memory device.

8. A method comprising:

receiving a request to execute a programming operation to program a target portion of a memory array of a memory device;

in response to the request, identifying a target wordline group associated with the target portion of the memory array;

identifying information associated with the target wordline group, wherein the information identifies a first good portion of the target wordline group and address information associated with a second bad portion of the target wordline group; and causing execution of the programming operation to program the first good portion of the target wordline group and using the address information associated with the second bad portion to selectively skip programming of the second bad portion of the target wordline group during the programming operation.

9. The method of claim 8, further comprising performing a look-up operation of a data structure storing the information associated with the target wordline group.

10. The method of claim 8, wherein the information associated with the target wordline group is identified during a power up operation associated with the memory device.

11. The method of claim 8, wherein the target portion of the memory array corresponds to a first memory die and a second memory die of the memory device.

12. The method of claim 11, wherein the first memory die comprises a first set of memory planes and the second memory die comprises a second set of memory planes.

13. The method of claim 12, wherein the information comprises a block address and a plane address of the target wordline group.

14. The method of claim 8, wherein the information identifying the second bad portion of the target wordline group is stored in a data structure of the memory device.

15. A non-transitory computer-readable storage medium comprising instructions that, when executed by a processing device, cause the processing device to perform operations comprising:

receiving a request to execute a programming operation to program a target portion of a memory array of a memory device;

in response to the request, identifying a target wordline group associated with the target portion of the memory array;

identifying information associated with the target wordline group, wherein the information identifies a first good portion of the target wordline group and address information associated with a second bad portion of the target wordline group; and causing execution of the programming operation to program the first good portion of the target wordline group and using the address information associated with the second bad portion to selectively skip programming of the second bad portion of the target wordline group during the programming operation.

16. The non-transitory computer-readable storage medium of claim 15, the operations further comprising performing a look-up operation of a data structure storing the information associated with the target wordline group.

17. The non-transitory computer-readable storage medium of claim 15, wherein the information associated with the target wordline group is identified during a power up operation associated with the memory device.

18. The non-transitory computer-readable storage medium of claim 15, wherein the target portion of the memory array corresponds to a first memory die and a second memory die of the memory device.

19. The non-transitory computer-readable storage medium of claim 18, wherein the first memory die comprises a first set of memory planes and the second memory die comprises a second set of memory planes, and wherein the information comprises a block address and a plane address of the target wordline group.

20. The non-transitory computer-readable storage medium of claim 15, wherein the information identifying the second bad portion of the target wordline group is stored in a data structure of the memory device.

* * * * *